Feb. 22, 1949.  D. J. WHITTINGHAM  2,462,586
SEAL FOR RESISTING HIGH PRESSURES
Filed Jan. 2, 1946
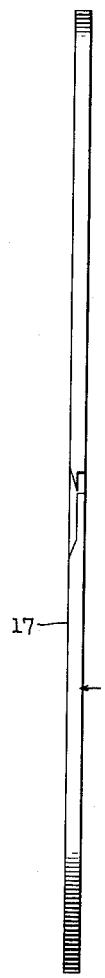
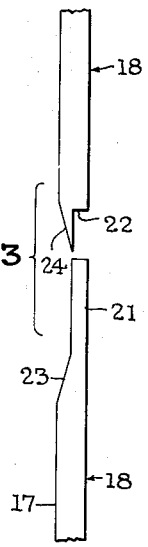
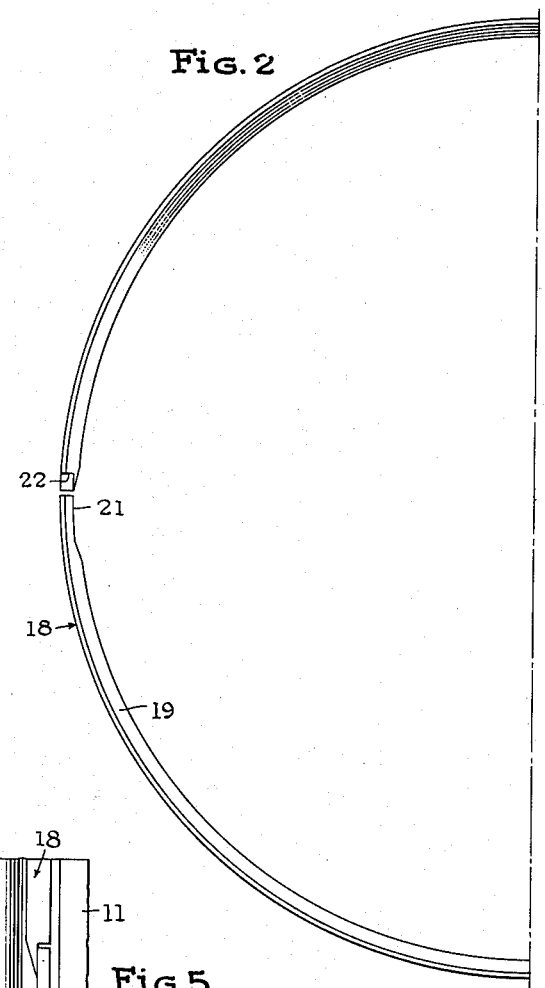
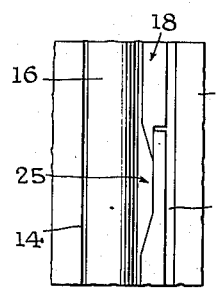
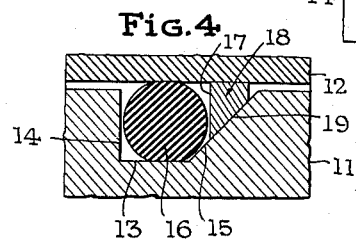
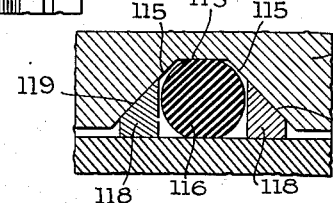
Inventor
David J. Whittingham
By
Attorneys Patented Feb. 22, 1949

2,462,586

UNITED STATES PATENT OFFICE 2,462,586

SEAL FOR RESISTING HIGH PRESSURES

David J. Whittingham, Watertown, N. Y., assignor to The New York Air Brake Company, a corporation of New Jersey Application January 2, 1946, Serial No. 638,626

2 Claims. (Cl. 309—23)

This invention relates to packing for pistons, piston-rods and the like, and has to do with so-called "O-rings" or "grommets" of rubber, synthetic rubber substitutes, or other resilient compositions.

These highly resilient rings, when used to seal against high pressures, are likely to extrude into the clearance between the packed surfaces. Efforts to cure the difficulty by the use of hard plastic or metal snap rings on one or both sides of the toric resilient ring have been made without success. Applicant after extensive test work has determined that a major cause of failure in the prior devices was occurrence of extrusion at the joint or gap in the snap ring.

The use of an improved joint at the gap of an expansible (or contractible) ring is an important feature of the invention. That the construction is successful is demonstrated, for pressures as high as 5000 p. s. i. have been withstood under the conditions of practical service.

The invention may be variously applied. The rings may be assembled in a groove in the encircled part, or in a groove in the encircling part. In the first case there is a general resemblance to "piston rings" whereas the second case generally resembles constructions used with rod packings or plunger packings. If the pressure differential against which the seal acts is undirectional only one extrusion-resisting ring is needed. It must be placed on the low pressure side. If the pressure differential reverses, two rings are needed, one at each side of the resilient ring.

Preferred embodiments of the invention will now be described by reference to the accompanying drawing, in which:

Fig. 1 is an edge view of the ring showing the gap.

Fig. 2 is a view of the beveled face of the ring showing the gap.

Fig. 3 is an enlarged view of the gap as viewed in Fig. 1.

Fig. 4 is an axial section through two packed cylindrical parts, showing the improved packing arranged to seal against a unidirectional pressure differential.

Fig. 5 is an elevation of the grooved part shown in Fig. 4 with the rings assembled therewith.

Fig. 6 is a view similar to Fig. 4 showing the improved packing arranged to seal against a pressure differential which reverses.

Much discussion has centered about the idea of allowing a resilient toric ring sufficient clearance to roll slightly in an axial direction so as to be "kneaded." The drawings show clearance, to permit rolling in an axial direction, simply to indicate that the invention may be used where such clearance is present. At high pressures, clearance to permit rolling is immaterial provided the volume of the ring is less than the volume of the groove. Deformation caused by pressure will distort the ring so much more severely that the deformation by rolling ceases to be significant, assuming that it ever was.

Refer first to Figs 1-5. In Fig. 4, 11 indicates an encircled member such as a cylindrical piston, and 12 represents the encircling member such as a cylinder. Member 11 has a groove whose bottom 13 is cylindrical. One side 14 of the groove is a plane surface normal to the axis of member 11 and the other side 15 is a right conical surface at about 45° as shown.

In the groove is a continuous toric ring 16 of rubber-like resilient material dimensioned to form the primary seal. As shown in Fig. 4 it is not deformed as it is when subject to the differential pressure against which it is intended to seal. On the contrary it is shown compressed merely in directions radial to the piston. So compressed the illustrated toric ring does not quite span the interval between side 14 and the proximate plane face 17 of ring 18. It is considered immaterial whether it does or not. Ring 18 has one conical face 19 which mates with conical side 15 of the groove.

Ring 18 is split and elastic, and preferably of material. As used in a piston it may have a slight expansive tendency but this is not considered indispensable. It is desirable that the ring inherently tends to seat on the wall of cylinder 12 around the entire periphery and a one piece ring is the logical choice.

The ring 18 has a step joint, best shown in Fig. 3. A tongue 21 enters rebate 22 formed on the side of ring 18 remote from ring 16 (i. e. the conical or beveled side). Tongue 21 merges into the adjacent portion of the ring by means of an inclined surface 23 and the opposite overlapping portion 24 is beveled to a feather edge. Thus a shallow recess indicated at 25 in Fig. 5 is present and receives a displaced portion of ring 16 when the pressure differential acts.

Stating direction with reference to Fig. 4, the pressure differential urges ring 16 to the right forcing it against the flat side of ring 18. Thus ring 18 is forced up the conical surface 15, and caused to seat outward on cylinder 12, so that there is no interval through which any portion of ring 16 can extrude, either around the ring or through the joint therein. The tapers at 23 and 24 facilitate contracting motions of ring 18.

Still referring to Fig. 4, it is obvious that 11 could be the encircling member and 12 the encircled member. This implies a reversed curvature of ring 18. Functionally the only material difference would be that the wedging action would cause the ring 18 to contract.

To afford an affirmative illustration of this possibility, Fig. 6 has been included. In addition, and as an independent optional feature, two rings similar to ring 18 are shown, with a ring similar to 16 between them. This affords a seal against pressure differentials acting in either direction.

In Fig. 6 similar parts are given the same numbers as in Figs. 1–5 increased by 100.

The encircled member is 111 and the encircling member 112. The groove is formed in the latter and has a cylindrical bottom 113 and two conical sides 115. The resilient toric ring 116 is placed between two rings 118 each with a step joint such as that shown in Fig. 3 and a beveled face 119 coacting with a corresponding side 115 of the groove.

The rings shown in Figs. 4 and 6 are shown slightly deformed. When unstressed they are circular in cross-section. Other cross-sections, ovoid or elliptical, are possible but offer no apparent advantage. Since grommets of such cross-section have been proposed and used their illustration is deemed unnecessary.

The precise form of the toric ring, and the clearance afforded it are subject to variation. The invention is concerned with the expansible extrusion resisting ring (or rings) 18. The use of an expansible ring with a step joint and some means to cause the ring to expand as the toric ring is displaced by pressure, and before extrusion starts, is the vital thing. The beveled ends of the recess 25 (Fig. 5) minimize local severe deformation of ring 16 and favor expansion or contraction of the ring 18 without interference by or damage to ring 16. Modifications consonant with the attainment of these objectives are obviously possible and within the scope of the invention. In the claims the terms piston and cylinder elements will be used in their broadest and most generic sense to cover two relatively slidable elements, one of which encircles the other.

What is claimed is:

1. A guard ring for resisting extrusion of rubber-like sealing rings into the working clearance of cylinder-piston assemblies of the type in which a groove in one component of the cylinder-piston assembly has a conical side portion and contains a rubber-like sealing ring which seals against the cylindrical face of the other component of said assembly, said guard ring being of substantially triangular cross-section and having a conical face face adapted to mate with the conical side portion of the groove in said one component, a cylindrical face adapted to mate with the cylindrical face of said other component, and a third face adapted to be presented toward said rubber-like ring, said guard ring being of hard elastic material and split so that it may expand and contract as it moves in contact with the conical side portion of the groove, the split being of stepped configuration and comprising a slender tongue which projects from the portion of the ring at one side of the split, overlaps the split and seats on a mating surface in a recess formed in the ring at the other side of the split, said mating surface being substantially parallel with and said recess being formed in said third face of the guard ring, the tongue and the recess with which it coacts having inclined ends whereby the tendency to pinch the rubber-like ring is minimized.

2. A guard ring according to claim 1 in which the ring has an elastic reaction, tending to seat its cylindrical face against the cylindrical face of said other component, when the ring is assembled with said cylinder-piston assembly.

DAVID J. WHITTINGHAM.

REFERENCES CITED

The following references are of record in the file of this patent:

UNITED STATES PATENTS

| Number | Name | Date |
| --- | --- | --- |
| 870,428 | Graham | Nov. 5, 1907 |
| 2,276,027 | Dick | Mar. 10, 1942 |
| 2,420,104 | Smith | May 6, 1947 |

Certificate of Correction

Patent No. 2,462,586.　　　　　　　　　　　　　　　　　　　February 22, 1949.

DAVID J. WHITTINGHAM

It is hereby certified that error appears in the printed specification of the above numbered patent requiring correction as follows:

Column 4, line 12, claim 1, after the word "conical" strike out "face";
and that the said Letters Patent should be read with this correction therein that the same may conform to the record of the case in the Patent Office.

Signed and sealed this 21st day of June, A. D. 1949.

[SEAL]

THOMAS F. MURPHY,
*Assistant Commissioner of Patents.*